(12) United States Patent
Bouse (10) Patent No.: US 11,455,621 B2
(45) Date of Patent: Sep. 27, 2022

(54) DEVICE-ASSOCIATED TOKEN IDENTITY

(71) Applicant: IDEMIA IDENTITY & SECURITY USA LLC, Billerica, MA (US)

(72) Inventor: Margaret Bouse, Lexington, MA (US)

( * ) Notice: Subject to any disclaimer, the term of this patent is extended or adjusted under 35 U.S.C. 154(b) by 508 days.

(21) Appl. No.: 15/360,551

(22) Filed: Nov. 23, 2016

(65) Prior Publication Data

US 2017/0148014 A1    May 25, 2017

Related U.S. Application Data (60) Provisional application No. 62/260,116, filed on Nov. 25, 2015.

(51) Int. Cl.
| | | |
|---|---|---|
| *G06Q 20/36* | (2012.01) | |
| *G06Q 20/40* | (2012.01) | |
| *G06Q 20/32* | (2012.01) | |

(52) U.S. Cl.
CPC ..... *G06Q 20/3674* (2013.01); *G06Q 20/3227* (2013.01); *G06Q 20/4014* (2013.01); *G06Q 20/40145* (2013.01)

(58) Field of Classification Search
CPC .......... G06Q 20/3674; G06Q 20/4014; G06Q 20/3227; G06Q 20/40145
See application file for complete search history.

(56) References Cited

U.S. PATENT DOCUMENTS

| | | | |
|---|---|---|---|
| 2009/0205028 A1* | 8/2009 | Smeets | H04W 12/0023 726/6 |
| 2011/0086616 A1* | 4/2011 | Brand | G06Q 20/425 455/411 |
| 2012/0109829 A1* | 5/2012 | McNeal | G06Q 50/265 705/67 |
| 2012/0209630 A1* | 8/2012 | Ihm | G06Q 20/02 705/4 |
| 2013/0086167 A1* | 4/2013 | Blom | G06Q 50/01 709/204 |
| 2013/0150000 A1* | 6/2013 | Wong | H04W 12/06 455/411 |
| 2014/0215586 A1* | 7/2014 | Tilton | G06F 21/34 726/6 |
| 2015/0026025 A1* | 1/2015 | Calman | G06Q 40/02 705/35 |
| 2015/0032626 A1* | 1/2015 | Dill | G06Q 20/40 705/44 |
| 2015/0186994 A1* | 7/2015 | He | G06Q 20/4014 705/44 |
| 2015/0379257 A1* | 12/2015 | Ahmed | G06F 16/245 726/19 |

(Continued)

*Primary Examiner* — Neha Patel
*Assistant Examiner* — Courtney P Jones
(74) *Attorney, Agent, or Firm* — Robert Facey (57) ABSTRACT

Techniques are disclosed for generating a token identity that is assigned to a device identity module of a customer device. The token identity may be used to incorporate various types of customer identifier data to verify a customer identity during an electronic transaction. For instance, a customer may initially provide customer information on a customer device, which may be used to obtain a digital identification associated with the customer. The customer may subsequently provide an input including a customer identifier on the customer device, which may be verified against the customer information included in the digital identification.

20 Claims, 4 Drawing Sheets

(56) References Cited

U.S. PATENT DOCUMENTS

| | | | |
|---|---|---|---|
| 2016/0055473 A1* | 2/2016 | Lin | G06Q 20/20 |
| | | | 235/380 |
| 2016/0057624 A1* | 2/2016 | Yang | H04L 9/3231 |
| | | | 455/411 |
| 2016/0224983 A1* | 8/2016 | Cash | G06Q 20/385 |
| 2017/0076293 A1* | 3/2017 | Cage | H04L 63/0853 |
| 2017/0116615 A1* | 4/2017 | Burgess | G06Q 20/322 |
| 2019/0087814 A1* | 3/2019 | Lassouaoui | G06F 21/44 |

* cited by examiner

DEVICE-ASSOCIATED TOKEN IDENTITY

CROSS-REFERENCE TO RELATED APPLICATION

This application claims the benefit of U.S. Provisional Application No. 62/260,116, filed Nov. 25, 2015, the contents of which are incorporated by reference.

FIELD

The present specification is related generally to identity management.

BACKGROUND

Transactions between a customer and a provider may be subject to risks of identity theft, identity fraud, spoofing, phishing, and ghosting, all of which may potentially hinder the flow of commerce, create security vulnerabilities to the telecommunications and communications systems, or introduce risk into the end-to-end transactional ecosystem.

SUMMARY

Mobile devices are often identified by providers, e.g., telecommunications service providers, using a device identity module that is associated with a customer identifier (e.g., an international mobile subscribed identity) and a private key used to authenticate customers of mobile devices to mobile telephony and data services. In some instances, the device identity module is a physical component configured to a mobile device such as, for example, a subscriber identity module (SIM) card or an extractable chip associated with a storage medium of mobile devices. In other instances, the device identity module is electronic credential data assigned to the mobile devices such as electronic SIM cards (e-SIMs).

Mobile devices may also store customer identifier data (e.g., usernames and passwords) to enable device-specific actions such as device access or automated authentication. However, in many instances, such customer identifier data stored on a mobile device is not associated with the device identity module of the mobile device, which often poses security risks to the customer if the device identity module is removed from the mobile device and used with another mobile device, or if the mobile device is reset to delete all stored customer identifier data.

Many mobile devices also use assigned biometric information to provide device access (e.g., fingerprint authentication). However, although such biometric information may be used to restrict access to the mobile device, the assigned biometric information may still be susceptible to fraud unless the identity of the individual assigning the biometric information to the mobile device is independently verified. However, service providers are often unable to independently verify such assigned biometric information because the device identity modules of mobile devices are not usually associated with customer identifier data stored on the mobile devices. In addition, because customer identifier data is often application-specific (e.g., password access to content), biometric identifiers of the customer are not often combined with customer identifier data to verify a claimed customer identity during an electronic transaction.

Accordingly, one innovative aspect described throughout this specification includes methods that generate a token identity that is assigned to a device identity module of a customer device. The token identity may be used to incorporate various types of customer identifier data to verify a customer identity during an electronic transaction. For instance, a customer may initially provide customer information on a customer device, which may be used to obtain a digital identification associated with the customer. The customer may subsequently provide an input including a customer identifier on the customer device, which may be verified against the customer information included in the digital identification.

The customer identifier data from the customer input, the digital identification and the device identity module on the customer device may then combined to generate a customer identification sequence that is used as a token identity for verifying the identity of the customer and performing a multi-factor customer authentication during electronic transactions. In this regard, because the token identity includes customer identifier data from various types of customer information sources (e.g., a valid digital identification, a device identity module of a mobile device, and an input from a customer), the device-associated token identity may be used to verify a customer identity, independently from device information, to improve security against counterfeiting and fraud.

Implementations may include one or more of the following features. For example, a computer-implemented method for generating a token identity for a customer may include: receiving, from the customer, a request for generating the token identity, the request including customer information associated with a digital identification of the customer; obtaining the digital identification of the customer based at least on the customer information included in the received request from the customer; receiving an identifier of the customer; determining that the identifier of the customer matches an identifier specified by the digital identification of the customer; in response to determining that the identifier of the customer matches an identifier specified by the digital identification of the customer, generating a customer identification sequence for the customer; assigning the generated customer identification sequence for the customer to a device identity module configured to the customer device; generating the token identity based at least on assigning the generated customer identification sequence for the customer to the device identity module configured to the customer device; and providing the token identity for output during an electronic transaction on the customer device.

Other versions include corresponding systems, and computer programs, configured to perform the actions of the methods encoded on computer storage devices.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

In general, this specification describes methods and systems for generating a customer token identity that may be used to more securely verify customer identity during an electronic transaction using various types of customer identifier data. For instance, a token identity generation process may be based on creating a customer identification sequence that combines customer identifier data such as a biometric identifier of the customer and customer information from a digital identification of the customer. The customer identification sequence may then be assigned to a device identity module configured to a customer device. In this regard, a token identity may be associated to the customer device, enabling providers to verify a customer identity in a subsequent electronic transaction using various types of customer identifier data.

The token identity may provide various advantageous security features when used in electronic transactions. For example, because the token identity is assigned to a device identity module, service providers may be able to verify the token identity in order to prevent fraudulent use of a device identity module after a customer device has been lost or stolen.

In another example, the token identity may include customer identifier data from a digital identification that is issued by an authorized agency (e.g., a government agency), which may enable cross-validation of customer identifier data. In such an example, government-vetted customer identifier data from the digital identification may be included in the token identity and used to compare against customer identifier data submitted by a customer in an electronic transaction.

In yet another example, the token identity may be used by service providers (e.g., telecommunications providers) to pre-configure device identity modules of devices at the point-of-sale without requiring manual configuration using additional customer identifier data. For instance, when a customer opts to purchase a new customer device, the token identity associated with a device identity module may be transferred by the service provider to another device identity module that is included with the new customer device such that the customer identifications included in the token identity is dynamically reconfigured to the new customer device. In this regard, the token identity enables the service providers to provide various device upgrade plans without requiring significant initial setup.

Figure 1A:
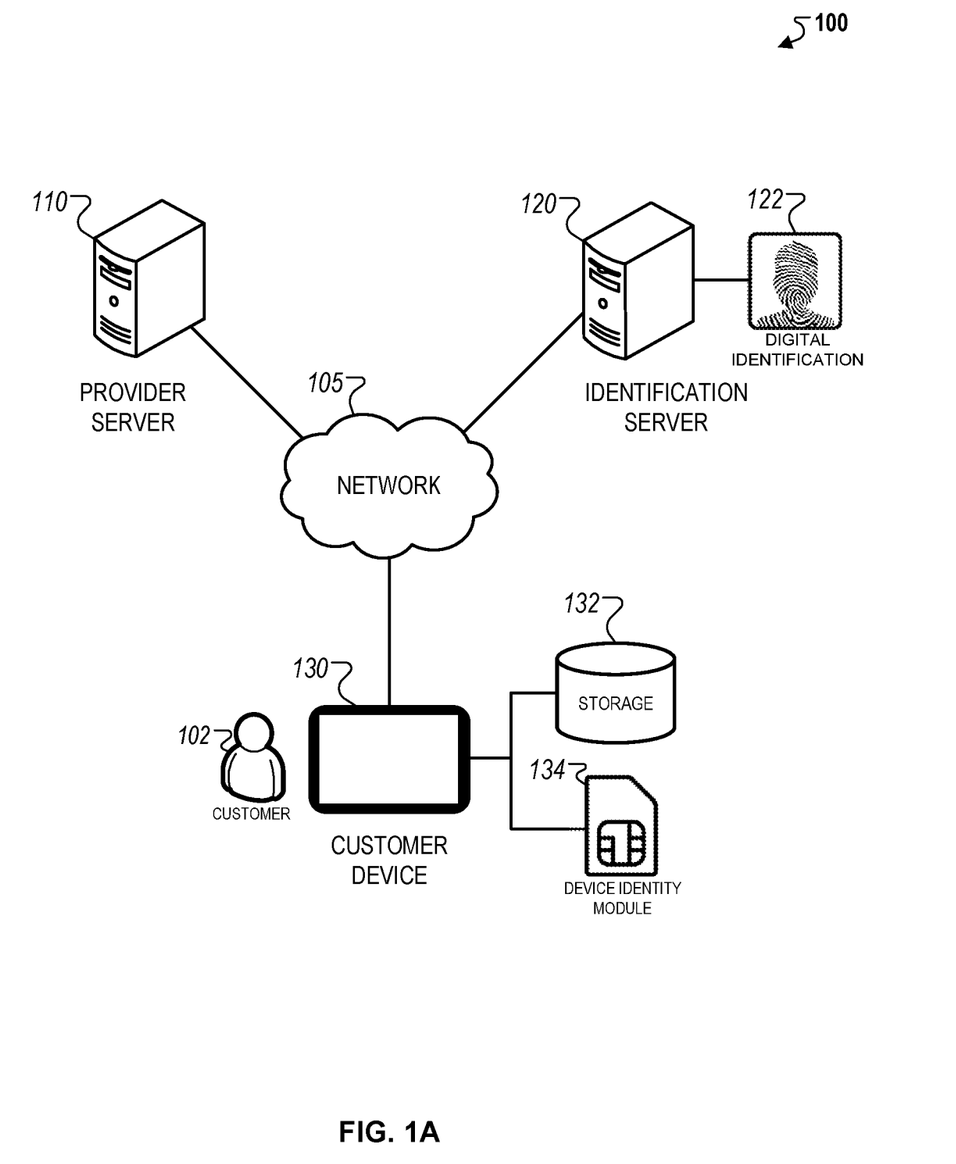
FIG. 1A illustrates a block diagram of an example of a system for generating a device-associated token identity.

FIG. 1A illustrates a block diagram of an example of a system 100 for generating a device-associated token identity. The system 100 may include a provider server 110, an identification server 120, and a customer device 130 of a customer 102 connected over a network 105. The identification server 120 may store a digital identification associated with the customer 102, and the customer device 130 may include a storage 132 and a device identity module 134.

In more detail, the network 105 may be configured to enable electronic communications between the provider server 110, the identification server 120, and the customer device 130. For instance, the network 105 may include Local Area Networks (LANs), wide area networks (WANs), Wi-Fi, or analog or digital wired and wireless networks. The network 105 may include multiple networks or subnetworks, each of which may include, for example, a wired or wireless data pathway. The network 105 may also include a circuit-switched network, a packet-switched data network, or any network capable of carrying electronic communications (e.g., data or voice communications). For example, the network 105 may include networks based on the Internet Protocol (IP), or other comparable technologies.

In some implementations, the network 105 may be a restricted cloud network operated and maintained by the server provider 110. For instance, in such implementations, the service provider 110 may be associated with a telecommunications provider that provides mobile telephony and data services to multiple client devices, such as the customer device 130, which are subscribed to a mobile subscription service (e.g., a service contract). For example, the network attributes of the network 105 such as bandwidth, connectivity, and latency may be adjusted by the provider server 110 to accommodate high data usage over the network 105.

The provider server 110 may be a remote server associated with a service provider such as, for example, a communications provider that provisions mobile telephony or data services to the customer device 130. The provider server 110 may exchange communications with the identification server 120 to obtained verified customer identifier data of the customer 102. For instance, the provider server 110 may obtain customer identifier data included in the digital identification 122 in order to verify customer identifier data received from the customer device 130 during a token identity enrollment process.

In some implementations, the provider server 110 may designate the device identity module 134 that is configured to the customer device 130. For instance, the provider server 110 may designate an international mobile subscriber identity (IMSI) number and a related key to the device identity module 134 in order to identify and authenticate the customer 102 on the customer device 130.

The provider server 110 may coordinate and administer the backend processes that are involved in generating and provisioning the token identity to a plurality of customers that are subscribed to services provisioned by the service provider. For instance, the provider server 110 may initiate processes to enroll customers, and operate security protocols to detect potential fraudulent use or privacy breaches associated with the token identity. In some instances, the processes associated with generating and provisioning the token identity may be coordinated by the provider server 110 to ensure that secure customer identifier data received from the digital identification 122 are not exposed during the generation of the token identity.

The identification server 120 may be a remote server that is operated by an issuing authority and used to control access to secure customer identifier data associated with the digital identification 122. In some instances, the identification server 120 may be operated by a government agency (e.g., the department of motor vehicles, social security administration, etc.). In such instances, the digital identification 122 may include customer identifier data that is vetted by the government agency as issued to the customer (e.g., driver license information, social security card, etc.).

The digital identification 122 may include customer identifier data that is associated with a customer record stored on a database of the identification server 120. For instance, the digital identification 122 may include demographic information of the customer, historical information associated with the customer (e.g., previous identification cards issued, number of renewals, etc.), and/or other types of customer identifier data that is used to verify the electronic identity of the customer.

In some implementations, access to the digital identification 122 may be restricted to protect the privacy of personally identifiable information included within the digital identification 122. In such implementations, access to the digital identification 122 by the provider server 110 may initially be authorized by the customer during the token identity enrollment process. In some instances, customer identifier data within the digital identification 122 that is transmitted to the provider server 110 may be encrypted and decrypted by the provider server 110 using customer credential data received from the customer device 130.

In one example, the digital identification 122 may be a digital driver license information that includes customer identifier data associated with a driver license issued by a state department of motor vehicles. In this example, the identification server 120 may be a server operated and maintained by the state department of motor vehicles, and the digital identification 122 may include information such as, for example, customer name, customer address, driver license number, date of issuance, expiration date, customer photograph, and/or biometric information associated with the driver license.

The customer device 130 may be a portable electronic computing device that is used by the customer 102 during mobile electronic transactions. For instance, the customer device 130 may be, for example, a smart phone, a tablet computer, a laptop computer, a personal digital assistant device, an electronic pad, a smart watch, a smart glass, or any electronic device with a display and is capable of connecting to the network 105.

The customer device 130 may exchange communications with the provider server 110 to receive and transmit information related to the token identity. For instance, the customer device 130 may be used to transmit customer identifier data during a token identity enrollment process, which may then be verified against the vetted customer identifier data included in the digital identification 122.

The customer device 130 may include the storage 132 and a SIM 134. For instance, the storage 132 may be non-transitory computer storage of the customer device 130 that stores customer data, computer-implemented instructions, or other application configuration files that are utilized to operate applications on the customer device 130.

In some implementations, the customer device 130 may include one or more biometric sensors (e.g., a fingerprint sensor, a retina scanner, or a face detection module, etc.). The biometric sensor may be used to capture biometric identifiers associated with the customer 102 and used by the provider server to verify customer identifier data received from the customer device 130 against customer identifier data included in the digital identification 122.

The device identity module 134 may be a physical or electronic component that is configured to the customer device 130 and used to identify a customer 102 that subscribes to a service provisioned by the provider server 110. The device identity module 134 may be associated with a customer identifier that is associated with a customer account stored on the provider server 110 and/or a private key used to authenticate the customer 102 to the services provisioned by the provider server 110.

In some implementations, the device identity module 134 may be a physical component such as, for example, a SIM card with an integrated circuit chip that stores an IMSI number and a related key associated with the customer 102. For instance, the device identity module 134 may be used to authenticate the customer 102 to the provider server 110 to enable the provisioning of mobile telephony and data services to the customer device 130. In such implementations, the device identity module 134 may be used with customer devices that operate on the Global System for Mobile (GSM) communication protocols, or alternatively, with customer devices that operate on Code Division Multiple Access (CDMA) communication protocols. In other instances, instead of being a SIM card, the device identity module 134 may alternatively be an electronic non-volatile computer storage medium such as flash memory that includes a customer configuration file that specifies the customer information that is traditionally included within a SIM card.

Alternatively or additionally, in some implementations, the device identity module 134 may be an electronic customer credential that is assigned to the customer 102 by the provider server 110 and stored on a computer-readable medium of the customer device 130. For instance, in such implementations, the device identity module 134 may be an electronic SIM (e-SIM) that is associated with the hardware of the customer device 130 but not accessible by the customer 102. In this regard, the device identity module 134 may be utilized by a device manufacturer (e.g., a smartphone manufacturer) to associate the customer device 130 with multiple service providers without requiring a physical component.

In some implementations, the device identity module 134 may be provisioned by the service provider that maintains and operates the provider server 110. In such implementations, the token identity may be generated and assigned to the device identity module 134 such that the token identity assigned to the device identity module 134 may be used to authenticate the customer 102 in electronic transactions. In some instances, the device identity module 134 may be used to enable a service provider to perform remote management capabilities of a customer account associated with the customer 102. For example, customer information included within the device identity module 134 may be accessible by the provider server 110 and provided to an account administrator of the customer account to update account information, make payments related to service provided, and/or perform other activities that are related to the management of the customer account.

Figure 1B:
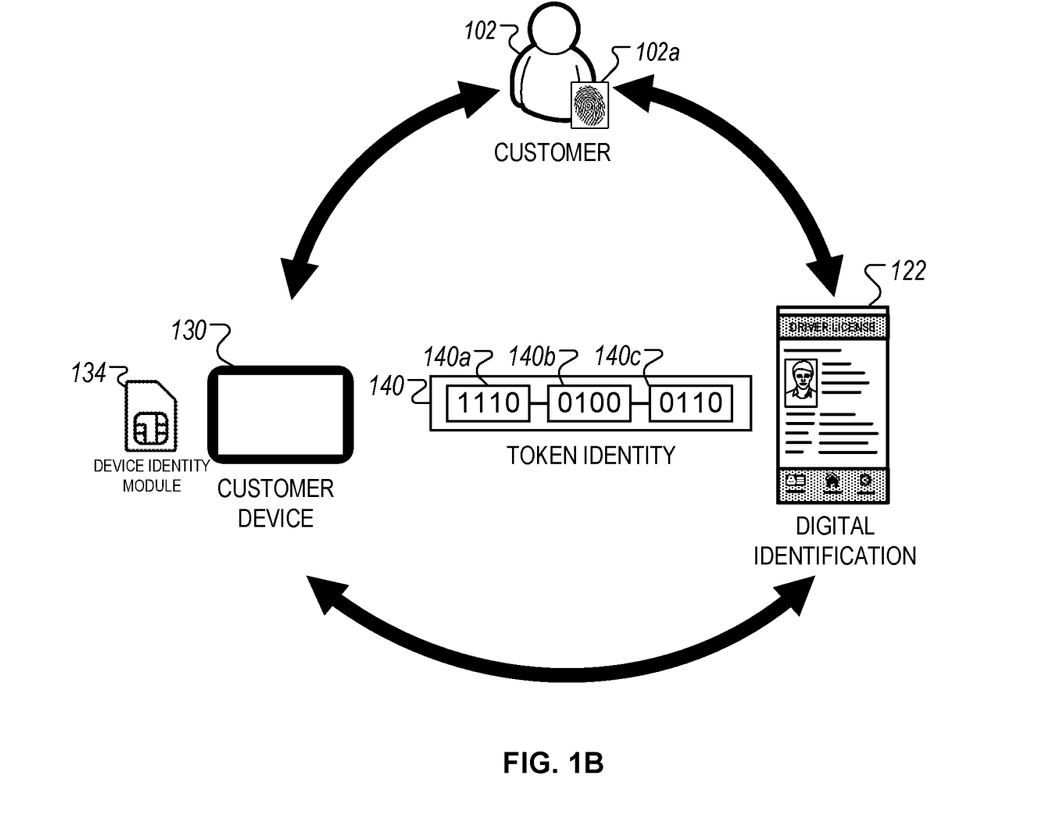
FIG. 1B illustrates a block diagram of examples of identifications that may be used to generate a device-associated token identity.

FIG. 1B illustrates a block diagram of examples of customer identifications that may be used to generate a token identity. Briefly, a token identity 140 may be generated based on combining a customer identifier 102a provided by the customer 102, a device identity module 134 configured to the customer device 130, and customer information included within the digital identification 122. In addition, the token identity 140 may further include a customer identification sequence that includes sequences 140a, 140b, 140c that each are associated with the customer identifier 102a, the device identity module 134, and the digital identification 122, respectively.

In more detail, the customer identifier 102a may include customer-specific information provided by the customer 102 to claim a specific customer identity. For example, the customer identifier 102a may include information that is known only to the customer 102a such as specified responses to security questions, and/or personally identifiable information that is associated with the customer such as a social security number, a unique customer identification number, or other types of non-replicable information.

In some implementations, the customer identifier 102a may include biometric features such as, for example, a biometric fingerprint, a skin texture analysis profile, a retina scan, or a facial image. In such instances, the biometric features may additionally be stored in other customer identifications (e.g., the digital identification 122) and used to independently verify the claimed identity of the customer 102 when providing the customer identifier 102a.

The customer identification sequence may be a data string that is a combination of data from the customer identifier 102a provided by the customer 102, data from a device identity module 134 configured to the customer device 130, and data from the digital identification 122. In some instances, the customer identification sequence may be combination of binary strings that are extracted from each of the customer identifications depicted in FIG. 1A. As shown, the sequence 140a may correspond to the customer identifier 102a, the sequence 140b may correspond to a unique identifier associated with the device identity module 134, and the sequence 130c may correspond to the customer information included within the digital identification 122.

Each of the sequences 140a, 140b, and 140c of the customer identification sequence may be generated based on applying a low-processor hash function to customer identifier data extracted from each customer identification to generate respective hash values, hash codes, or hash sums associated with each sequence. The customer identifier data may be included in a hash table that specifies hash keys that map to subsets of customer identifier data (e.g., first name, last name, etc.) particular hash values. Each of the particular hash values for each customer identification may then be aggregated to generate the sequences 140a, 140b, and 140c.

In some implementations, the hash function used to generate the sequences 140a, 140b, and 140c may be a Pearson hash that is designed for fast execution. For instance, in such implementations, extracted customer identifier data may initially be processed to generate a binary string, which is then hashed using the Pearson hash to generate sequences 140a, 140b, and 140c that are relatively small but strongly dependent on the content and sequence of information within the binary string. In this regard, the Pearson hash may be used to generate the customer identification sequence in resource-constrained settings or during transactions where there is a need to extract customer identifier data from the customer identification sequence relatively quickly.

The sequences 140a, 140b, and 140c may then be combined to generate the customer identification sequence. In some implementations, the combination include concatenating of the values of each sequence such that the customer identification sequence is a binary string that includes values associated with each of the sequences 140a, 140b, and 140c as indicated in FIG. 1B. In some implementations, the combination may include applying secondary encryption techniques to further secure the customer identifier data that is included within the customer identification technique. In such implementations, a private or a public decryption key may be utilized to encrypt the customer identification sequence.

Although FIGS. 1A-1B depict the customer device 130 as a mobile device, in some implementations, the customer device 130 may be an electronic device that is capable of exchanging communications over an Internet of Things (IoT) network. In such implementations, the customer device may be embedded with electronics, software, sensors, and network connectivity that enables the customer device 130 to collect and exchange data over the IoT network. For example, the customer device 130 may be remotely accessed and controlled across an existing network infrastructure such as, for example, the network 105. In this regard, the customer device 130 may be any type of electronic device that is capable of establishing a network connection and identified based on the device identity module 134.

Figure 2:
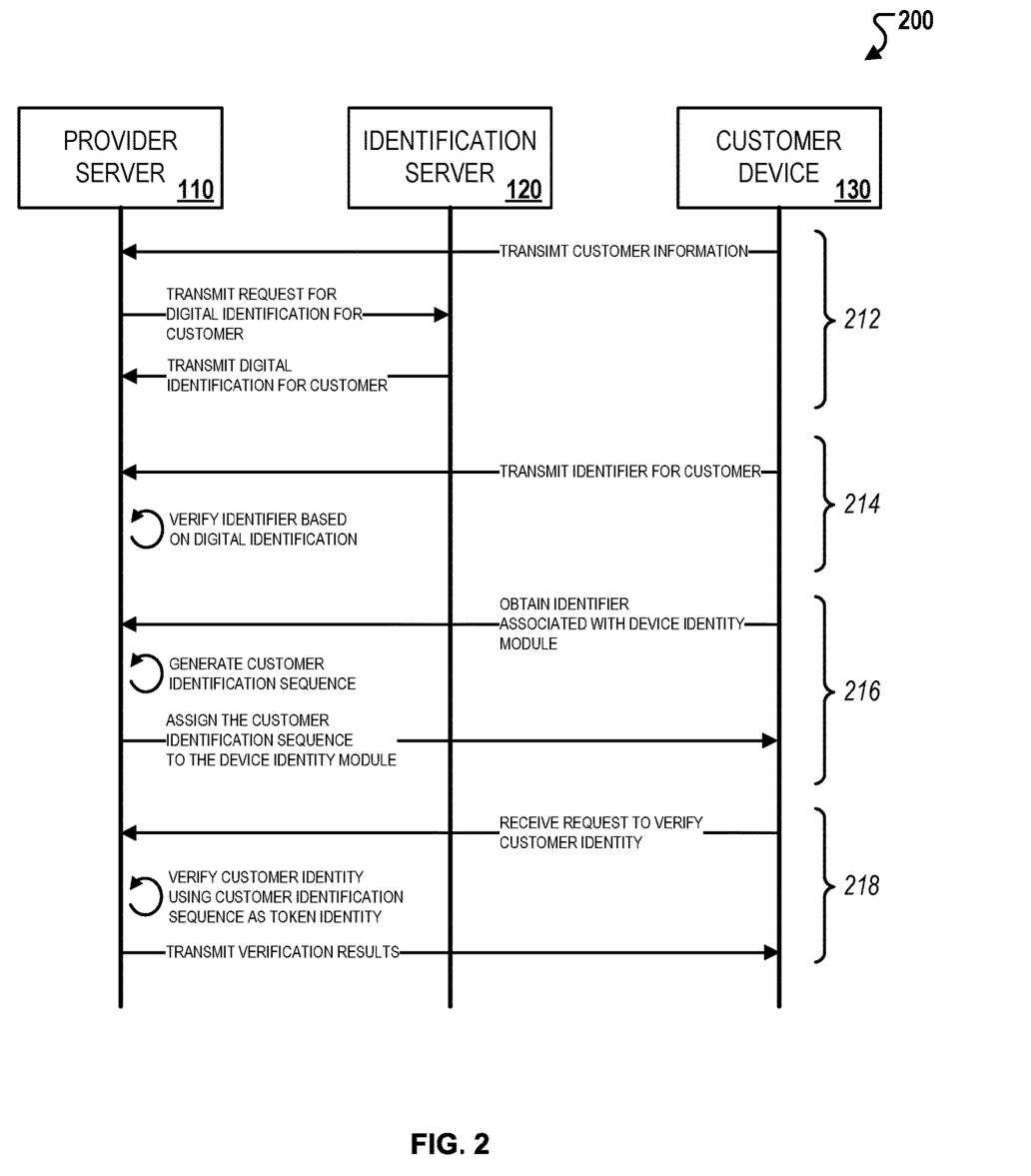
FIG. 2 illustrates an interaction diagram between a customer device, a digital identification, and a device identity module during a device-associated token identity generation process.

FIG. 2 illustrates an interaction diagram between a customer device, a digital identification, and a device identity module. Initially, the customer device 130 may transmit customer information to the provider server 110. In response, the provider server 110 may transmit a request for the digital identification 122 from the identification server 120 based on the received customer information, and the identification server 120 may then transmit the digital identification 122 for the customer (212).

In some instances, the customer information include customer-specified credential information (e.g., username, password, etc.). Alternatively, in other instances, the customer information may include data associated with a customer identification. For example, the customer identification may include a physical identification card issued by an issuing authority (e.g., a driver license), or a digital identification that is an electronic version of the physical identification card (e.g., a QR code associated with a driver license). In addition, in some implementations, the customer information may be transmitted as a photograph of the physical identification, or a data file including information related to the digital information.

The provider server 110 may use the received customer information to obtain the digital identification 122 for the customer 102. For instance, the provider server 110 may process the received customer information and identify customer indexes that are used to access a customer account repository on the identification server 120 and obtain the digital identification 122 for the customer 102 included within the customer account. For example, if the received customer information is a picture of a driver license, then the provider server 110 may identify a driver license identification and obtain the digital identification 122 that includes driver license information stored on the database of the state department of motor vehicles.

The customer device 130 may then transmit the customer identifier 102a for the customer 102 to the provider server 110, and the provider server 110 may verify the customer identifier based on the digital identification 122 (214). For instance, the customer device 130 may initially receive a customer identifier 102a from the customer 102. In some instances, the customer identifier 102a may be a biometric feature associated with the customer 102a such as, for example, facial image of the customer 102 taken using the customer device 130, or a fingerprint of the customer 102a that is collected using a biometric sensor of the customer device 130. In other instances, the customer identifier 102a may be customer-verifiable information known only to the customer and used to be independently verified against the customer information specified within the digital identification 122.

The provider server 110 may then verify the received customer identifier 102a based on comparing the customer identifier 102a and the customer information within the digital identification 122. In the example where the received customer identifier 102a is a photograph of the customer 102, the provider 110 may compare the received photograph to a customer account photograph included in the digital identification 122. In another example where the received customer identifier 102a is a fingerprint, the provider server 110 may compare the fingerprint to a customer account fingerprint stored in the identification server 120.

The provider server 110 may then obtain an identifier associated with the device identity module 134 configured to the customer device 130, generate the customer identification sequence, and assign the customer identification sequence to the device identity module 134 as the token identity 140 (216). For instance, the provider server 110 may obtain the IMSI number of the customer 102 designated by the device identity module 134. The provider server 110 may then generate the customer identification sequence using data from the customer identifier 102a, data from the device identity module 134, and data from the digital identification 132 using the techniques described with respect to FIG. 1B.

The provider server 110 may then assign the generated customer identification sequence to the device identity module 134. For example, the customer identification sequence may be written to a written to a segment of the device identity module 134 that store network-specific information used to authenticate and identify customers on a provider network. For example, the customer identification sequence may be stored as the token identity 140 in the same location where carrier-specific data is stored (e.g., Short Message Service Center (SMSC) number, Service Provider Name (SPN), Service Dialing Numbers (SDN), etc.). In this regard, the token identity 140 stored on the device identity module 134 may be used as a device-associated credential in addition to existing credentials stored on the device identity module 134.

In some implementations, after generating the token identity 140, the provider server 110 may additionally or apply an encryption technique to protect customer information included within the token identity 140. For instance, as described previously with respect to FIG. 1B, in such implementations, the provider server 140 may use a hash function with an associated hash map to encrypt the customer information included within the token identity 140. The provider server 110 may also generate a decryption key to decrypt the encrypted token identity 140 for use during an electronic transaction.

In some implementations, the token identity 140 may be assigned to a new device identity module 134 of a newly manufactured customer device 130 prior to a retail purchase. For example, in such implementations, the current token identity 140 of a customer 102 from a current customer device 130 may initially be extracted from the current device identity module 134 and temporary stored in a repository associated with the provider server 110. After a customer 102 has either purchased or ordered a new customer device 130, the extracted token identity in the repository may then be assigned to the new device identity module 134 of the newly purchased customer device 130. In this regard, the token identity 140 may be used within a point-of-sale system to dynamically transfer customer credential information between multiple customer devices without significant setup.

In some implementations, after generating the customer sequence number, the provider server 110 may transmit an instruction to store the generated customer sequence number on the storage 132 of the customer device 130. For instance, the generated customer identification number may be temporarily stored within a cache of the storage 132 for a particular period of time (e.g., five minutes). In such implementations, the customer identification sequence may be used as a time-dependent single use verification technique during an electronic transaction.

Finally, during an electronic transaction on the customer device 130, the provider server 110 may receive a request to verify the customer identity, verify the customer identity using the customer identification sequence as the token identity 140, and transmit the verification results to the client device 130 (218). For instance, the token identity 140 may be used to verify the customer identity during an electronic transaction where the customer device 130 is used for customer authentication.

In one example, customer identity verification during an electronic transaction may include only comparing customer biometric information within the token identity 140 to customer-submitted biometric data. For instance, a customer may initially submit biometric data (e.g., a fingerprint, facial image, etc.) in order to claim a customer identity and the provider server 110 may verify the claimed customer identity by validating the submitted biometric information against the customer identifier 102a included in the token identity 140. In such instances, the provider server 110 may extract the customer identification sequence from the token identity 140 stored on the device identity module 134, and then decode the sequence 140b to extract the customer identifier 102a.

In another example, customer identity verification during an electronic transaction may include comparing multiple types of customer identifier data to customer-submitted information. For instance, in this example, a customer may submit identification data (e.g., a driver license ID) in addition to biometric data in order to claim a customer identity. The provider server may then verify the different types of user-submitted data against the corresponding customer identifier data included within the token identity 140. In such instances, the provider server 110 may extract the customer identification sequence from the token identity 140 stored on the device identity module 134, decode each of the sequences 140a, 140b, and 140c and extract the respective customer identifier data. In this regard, the token identity 140 may be used to verify the customer identity using multiple customer identifications (e.g., biometric data, identification data, and device data).

Although FIG. 2 depicts the provider server 110 performing the customer identity verification, in some implementations, the customer identity may alternatively be performed by the customer device 130 without network connectivity. For example, after assigning the customer identification sequence to the device identity module 134, the provider server 110 may additionally transmit a set of computer-implemented protocols that enable the customer device 130 to extract the customer identifications sequence from the token identity 140, and decode individual sequences 140a, 140b, and 140c without connectivity to the provider server 110. In such implementations, the token identity 140 may be used to verify the customer identity in offline transactions where the customer device has limited or no network connectivity.

Figure 3:
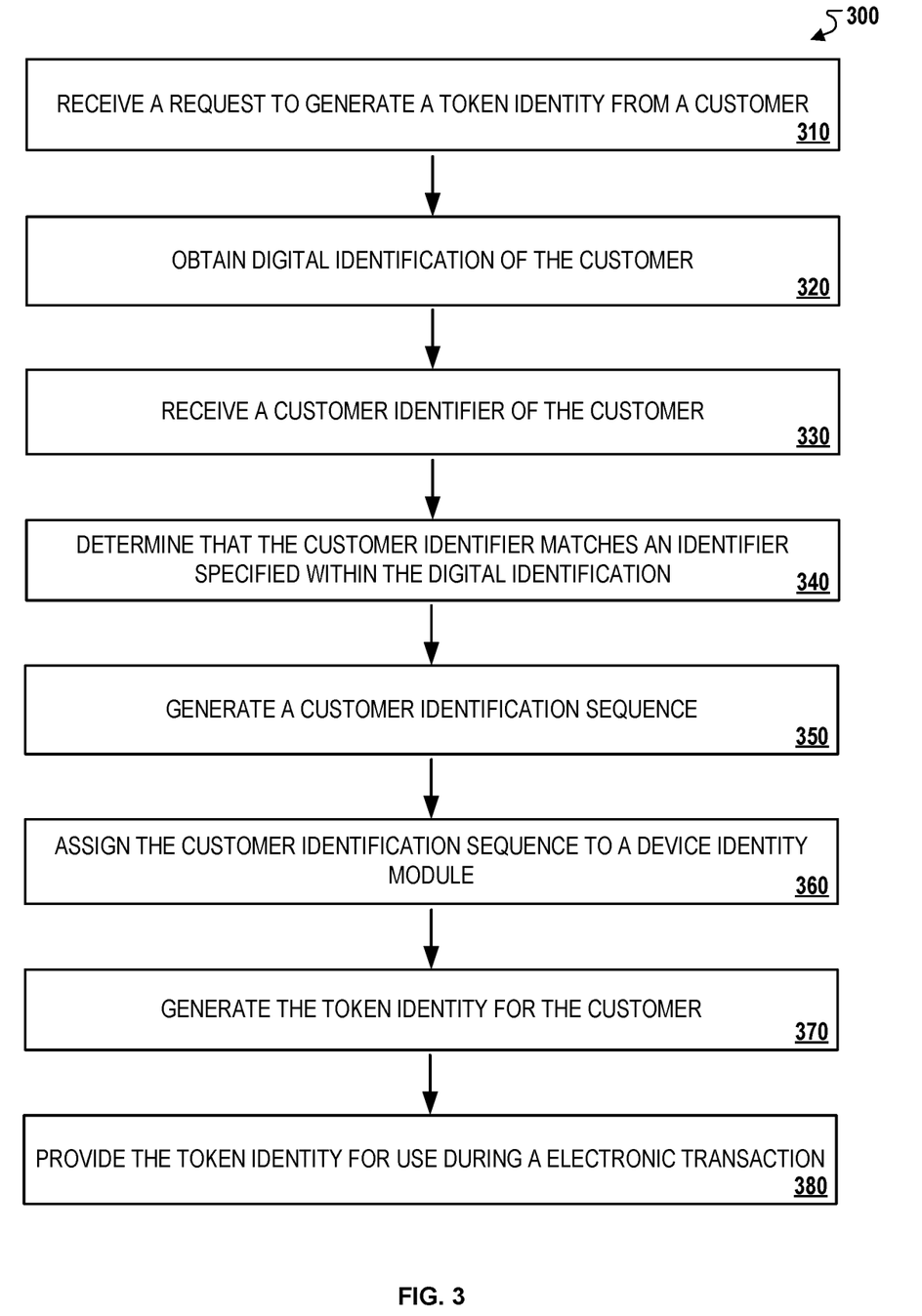
FIG. 3 illustrates a flowchart of an example process for generating a device-associated token identity for a customer.

FIG. 3 illustrates a flowchart of an example process for generating a device-associated token identity for a customer. Briefly, the process 300 may include receiving a request to generate a token identity from a customer (310), obtaining a digital identification of the customer (320), receiving a customer identifier of the customer (330), determining that the customer identifier matches an identifier specified within the digital identification (340), generating a customer identification sequence (350), assigning the customer identification sequence to a computer-readable medium configured to the customer device (360), generating the token identity for the customer (370), and providing the token identity for use during an electronic transaction (380).

In more detail, the process 300 may include receiving a request to generate a token identity from a customer (310). For instance, the provider server 110 may receive, from the customer device 130, a request for generating the token identity 140. The request may include customer information associated with the digital identification 122 of the customer 102.

The process 300 may include obtaining a digital identification of the customer (320). For instance, the provider server 110 may obtain the digital identification 122 of the customer 102 based on the customer information included in the received request from the customer device 130.

The process 300 may include receiving a customer identifier of the customer (330). For instance, the provider server 110 may receive the customer identifier 102a of the customer 102.

The process 300 may include determining that the customer identifier matches the customer identifier data (340). For instance, provider server 110 may determine that the customer identifier 102a of the customer 102 matches an identifier specified by the digital identification 122 of the customer 102.

The process 300 may include generating a customer identification sequence (350). For instance, in response to determining that the customer identifier 102a of the customer 102 matches the identifier specified by the digital identification 122 of the customer 102, the provider server 110 may generate a customer identification sequence for the customer 102. For example, the customer identification sequence may include sequences 140a, 140b, and 140c as depicted in FIG. 1B.

The process 300 may include assigning the customer identification sequence to a device identity module configured to the customer device (360). For instance, the provider server 110 may assign the generated customer identification sequence for the customer 102 to the device identity module 134 configured to the customer device 130.

The process 300 may include generating the token identity for the customer (370). For instance, the provider server 110 may generate the token identity 140 based on assigning the generated customer identification sequence for the customer 102 to the device identity module 134 configured to the customer device 130.

The process 300 may include providing the token identity for use during an electronic transaction (380). For instance, during the provider server 110 may provide the token identity 140 for output during an electronic transaction on the customer device 130.

As described throughout, computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files, such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well, for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), a cloud network, a restricted private network, and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
receiving, from a computing device of a customer, (i) customer information associated with the customer, and (ii) first customer credential data provided by the customer on the computing device;
obtaining, from a server storing information about customer identification documents, a digital identification corresponding to the customer based at least on the customer information, wherein the digital identification specifies second customer credential data that is verified as identifying the customer;
determining that the first customer credential data matches the second customer credential data specified by the digital identification;
in response to determining that the first customer credential data matches the second customer credential data specified by the digital identification:
obtaining, from the computing device of the customer, an international mobile subscriber identity (IMSI) number associated with a device identity module configured to the customer device;
generating a first binary string of the first customer credential data;
generating a second binary string of the obtained digital identification corresponding to the customer;
generating a third binary string of an international mobile subscriber identity (IMSI) number associated with a device identity module of the computing device, wherein the device identity module is configured to permit the computing device to receive one or more telecommunications services through the IMSI number; and
generating a customer identification sequence for the customer by concatenating the first binary string, the second binary string, and the third binary string;
storing, within the device identity module, the customer identification sequence as a token identity, wherein the token identity identifies a mapping between the second customer credential data and the IMSI number; and
providing data indicating the token identity for output.

2. The method of claim 1, wherein the device identity module comprises a subscriber identity module (SIM) card.

3. The method of claim 1, wherein the device identity module comprises an electronic subscriber identity module (eSIM) assigned to the computing device by a service provider that provisions the one or more one or more telecommunications services.

4. The method of claim 1, wherein:
the first customer credential data comprises a first biometric identifier provided by the customer on the computing device;
the second customer credential data comprises a second biometric identifier that (i) has been verified by an issuing authority that issues the digital identification and (ii) stored in one or more databases associated with the issuing authority; and
determining that the first customer credential data matches the second customer credential data specified by the digital identification comprises determining that the first biometric identifier matches the second biometric identifier.

5. The method of claim 1, wherein the digital identification comprises a digital driver license issued to the customer by a state department of motor vehicles.

6. The method of claim 5, wherein:
the first customer credential data comprises a driver license number provided by the customer on the computing device;
the second customer credential data comprises a verified driver license number specified in a customer record associated with the state department of motor vehicles; and
determining that the first customer credential data matches the second customer credential data specified by the digital identification comprises determining that the driver license number provided by the customer on the computing device matches the verified driver license number specified in the customer record.

7. The method of claim 1, further comprising:
providing, to the computing device, an instruction to store the token identity on the computing device in association with the device identity module; and
after providing the instruction to store the token identity on the computing device in association with the device identity module:
obtaining data indicating (i) an electronic transaction requested to be performed in association with the IMSI number, (ii) the token identity stored on the computing device, and (iii) third customer credential data provided on the computing device with the electronic transaction;
determining that the third customer credential data does not match the second customer credential data specified by the mapping identified in the token identity; and
determining that the third customer credential data is not valid based on determining that the third customer credential data does not match the second customer credential data specified by the mapping identified in the token identity.

8. The method of claim 7, further comprising:
determining that the electronic transaction requested to be performed in association with the IMSI number is potentially fraudulent based on determining that the third customer credential data is not valid; and
providing, to a service provider that provisions the one or more telecommunications services, an indication that the electronic transaction requested to be performed in association with the IMSI number is potentially fraudulent.

9. A system comprising:
one or more computers; and
one or more storage devices storing instructions that, when executed by the one or more computers, cause the one or more computers to perform operations comprising:
receiving, from a computing device of a customer, (i) customer information associated with the customer, and (ii) first customer credential data provided by the customer on the computing device;
obtaining, from a server storing information about customer identification documents, a digital identification corresponding to the customer based at least on the customer information, wherein the digital identification specifies second customer credential data that is verified as identifying the customer;

determining that the first customer credential data matches the second customer credential data specified by the digital identification;

in response to determining that the first customer credential data matches the second customer credential data specified by the identification:

obtaining, from the computing device of the customer, an international mobile subscriber identity (IMSI) number associated with a device identity module configured to the customer device;

generating a first binary string of the first customer credential data;

generating a second binary string of the obtained digital identification corresponding to the customer;

generating a third binary string of the international mobile subscriber identity (IMSI) number associated with the device identity module of the computing device, wherein the device identity module is configured to permit the computing device to receive one or more telecommunications services through the IMSI number; and generating a customer identification sequence for the customer by concatenating the first binary string, the second binary string, and the third binary string;

storing, within the device identity module, the customer identification sequence as a token identity, wherein the token identity identifies a mapping between the second customer credential data and the IMSI number; and providing data indicating the token identity for output.

10. The system of claim 9, wherein the device identity module comprises a subscriber identity module (SIM) card.

11. The system of claim 9, wherein the device identity module comprises an electronic subscriber identity module (eSIM) assigned to the computing device by a service provider that provisions the one or more one or more telecommunications services.

12. The system of claim 9, wherein:

the first customer credential data comprises a first biometric identifier provided by the customer on the computing device;

the second customer credential data comprises a second biometric identifier that (i) has been verified by an issuing authority that issues the digital identification and (ii) stored in one or more databases associated with the issuing authority; and determining that the first customer credential data matches the second customer credential data specified by the digital identification comprises determining that the first biometric identifier matches the second biometric identifier.

13. The system of claim 9, wherein the digital identification comprises a digital driver license issued to the customer by a state department of motor vehicles.

14. The system of claim 13, wherein:

the first customer credential data comprises a driver license number provided by the customer on the computing device;

the second customer credential data comprises a verified driver license number specified in a customer record associated with the state department of motor vehicles; and determining that the first customer credential data matches the second customer credential data specified by the digital identification comprises determining that the driver license number provided by the customer on the computing device matches the verified driver license number specified in the customer record.

15. The system of claim 9, wherein the operations further comprise:

providing, to the computing device, an instruction to store the token identity on the computing device in association with the device identity module; and after providing the instruction to store the token identity on the computing device in association with the device identity module:

obtaining data indicating (i) an electronic transaction requested to be performed in association with the IMSI number, (ii) the token identity stored on the computing device, and (iii) third customer credential data provided on the computing device with the electronic transaction;

determining that the third customer credential data does not match the second customer credential data specified by the mapping identified in the token identity; and determining that the third customer credential data is not valid based on determining that the third customer credential data does not match the second customer credential data specified by the mapping identified in the token identity.

16. A non-transitory computer-readable storage device encoded with computer program instructions that, when executed by one or more computers, cause one or more computers to perform operations comprising:

receiving, from a computing device of a customer, (i) customer information associated with the customer, and (ii) first customer credential data provided by the customer on the computing device;

obtaining, from a server storing information about customer identification documents, a digital identification corresponding to the customer based at least on the customer information, wherein the digital identification specifies second customer credential data that is verified as identifying the customer;

determining that the first customer credential data matches the second customer credential data specified by the digital identification;

in response to determining that the first customer credential data matches the second customer credential data specified by the digital identification:

obtaining, from the computing device of the customer, an international mobile subscriber identity (IMSI) number associated with a device identity module configured to the customer device;

generating a first binary string of the first customer credential data;

generating a second binary string of the obtained digital identification corresponding to the customer;

generating a third binary string of an international mobile subscriber identity (IMSI) number associated with a device identity module of the computing device, wherein the device identity module is configured to permit the computing device to receive one or more telecommunications services through the IMSI number; and generating a customer identification sequence for the customer by concatenating the first binary string, the second binary string, and the third binary string;

storing, within the device identity module, the customer identification sequence as a token identity, wherein the token identity identifies a mapping between the second customer credential data and the IMSI number; and providing data indicating the token identity for output.

17. The non-transitory computer-readable storage device of claim 16, wherein the device identity module comprises a subscriber identity module (SIM) card.

18. The non-transitory computer-readable storage device of claim 16, wherein the device identity module comprises an electronic subscriber identity module (eSIM) assigned to the computing device by a service provider that provisions the one or more one or more telecommunications services.

19. The non-transitory computer-readable storage device of claim 16, wherein:
- the first customer credential data comprises a first biometric identifier provided by the customer on the computing device;
- the second customer credential data comprises a second biometric identifier that (i) has been verified by an issuing authority that issues the digital identification and (ii) stored in one or more databases associated with the issuing authority; and
- determining that the first customer credential data matches the second customer credential data specified by the digital identification comprises determining that the first biometric identifier matches the second biometric identifier.

20. The non-transitory computer-readable storage device of claim 16, wherein the digital identification comprises a digital driver license issued to the customer by a state department of motor vehicles.

* * * * *